Sept. 17, 1929.    S. WHITWORTH    1,728,384
BRAKE
Filed July 14, 1928

INVENTOR
STANLEY WHITWORTH
BY
ATTORNEY

Patented Sept. 17, 1929

1,728,384

UNITED STATES PATENT OFFICE

STANLEY WHITWORTH, OF SOUTH BEND, INDIANA, ASSIGNOR TO BENDIX BRAKE COMPANY, OF SOUTH BEND, INDIANA, A CORPORATION OF ILLINOIS

BRAKE

Application filed July 14, 1928. Serial No. 292,882.

This invention relates to brakes, and is illustrated as embodied in an internal expanding brake for the rear wheel of an automobile. An object is to provide an inexpensive but effective device such as a bracket having a part serving as a bearing for the brake camshaft, and having other parts serving to position the cam in its released position, to guide the shoe ends, etc.

Preferably the bracket is made by permanently securing together two separately-formed pieces, one of which may be a screw-machine product and the other of which is best made as a steel stamping. The first or screw-machine part serves as the shaft bearing, while the stamped part not only serves to secure the bracket to the brake backing plate but also to provide the cam stop and the guides for the shoe ends. The bracket may be secured to the backing plate by pins which are extended to form posts for the attachment of the brake return springs.

The above and other objects and features of the invention, including various novel and desirable details of construction, will be apparent from the following description of the illustrative embodiment shown in the accompanying drawing, in which.

Figure 1:
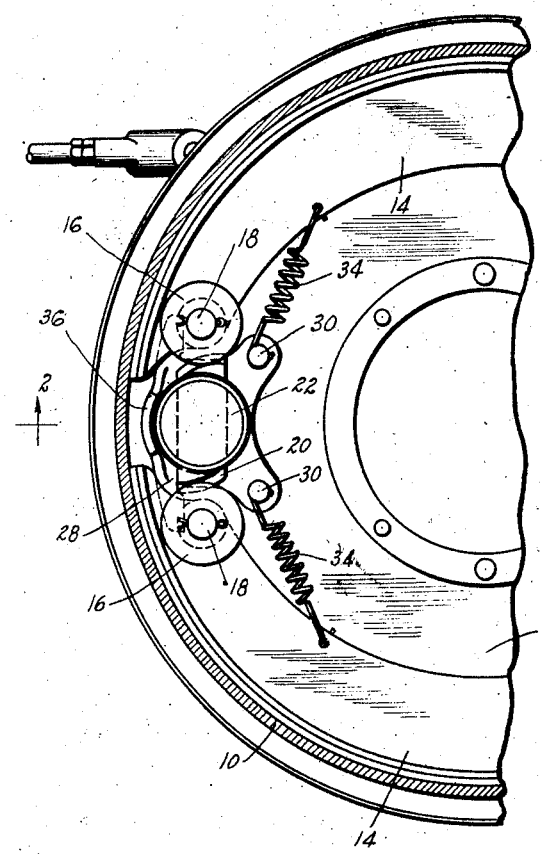
Figure 1 is a vertical section through part of the brake, just inside the head of the brake drum, and showing portions of the brake shoes in side elevation and with the brake applied.

The illustrated brake includes a rotatable drum 10, at the open side of which is a backing plate 12, and within which are pivoted brake shoes 14 having stiffening webs provided at the ends of the shoes with thrust rollers 16 on their opposite sides. Rollers 16 are mounted on pivot pins 18 extending transversely through the shoe webs. The brake is operated by means such as a shifting and transversely-floating cam 20 extending through a slot in an enlarged portion 22 of a camshaft 24. The cam is shown in applied position in Figure 1 and in released position in Figure 4.

Figure 3:
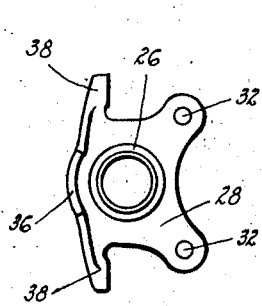
Figure 3 is an end elevation of the detached bracket, looking in the same direction as in Figure 1.

The present invention relates to a novel camshaft support, shown detached in Figure 3, whether or not the remainder of the brake is of the type described above.

Preferably this novel support or bracket is made by permanently securing together a screw machine product 26, serving as the camshaft bearing, and a steel stamping 28, these parts being shown as secured together by the shear-riveting method described in my prior application No. 275,886, filed May 7, 1928.

The stamping 28 may be secured to the backing plate 12 by means of pins or rivets 30 passing through openings 32, and which are extended to form posts for the attachment of return springs 34 secured at their opposite ends to the shoes 14.

Figure 4:
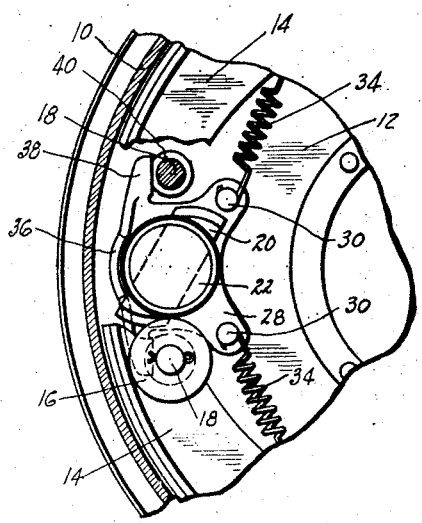
Figure 4 is a view corresponding to Figure 1, but showing the brake released.
Figure 2:
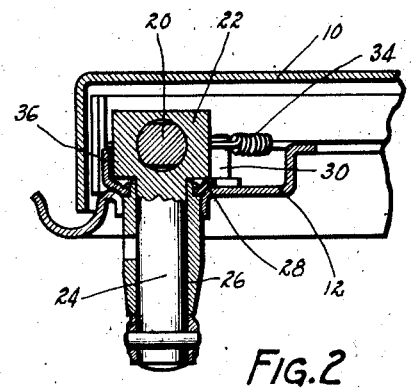
Figure 2 is a horizontal section through part of the brake, on the line 2—2 of Figure 1, showing the structure of the novel bracket.

Stamping 28 has a lug 36, curved cylindrically about one side of the shaft portion 22, and which serves as a stop for engagement with cam 20 in released position, as shown in Figure 4. It may also be formed with laterally-extending wings 38 formed with straight guide surfaces engaged by the flattened sides of heads 40 (Figure 4) formed on the ends of roller pivots 18, thus guiding the cam ends of the shoes. Springs 34 urge heads 40 against these wings 38.

While one illustrative embodiment has been described in detail, it is not my intention to limit the scope of the invention to that particular embodiment, or otherwise than by the terms of the appended claims.

I claim:

1. A brake having, in combination with a backing plate and shoes having adjacent separable ends, a shaft having a transversely-floating cam acting on said ends, a shaft bearing extending through the backing plate and in which said shaft is journaled, and a stamping to which said bearing is permanently secured and which is fixedly secured to said backing plate.

2. A brake having, in combination with a backing plate and shoes having adjacent separable ends, a shaft having a transversely-floating cam acting on said ends, a shaft bearing extending through the backing plate and in which said shaft is journaled, and a stamping to which said bearing is permanently secured and which is fixedly secured to said backing plate, said stamping being formed with a projection serving as a stop engaged by the cam when the brake is released.

3. A brake having, in combination with a backing plate and shoes having adjacent separable ends, a shaft having a transversely-floating cam acting on said ends, a shaft bearing extending through the backing plate and in which said shaft is journaled, and a stamping to which said bearing is permanently secured and which is fixedly secured to said backing plate, said stamping being formed with a projection curved about one side of said shaft and serving as a stop engaged by the cam when the brake is released.

4. A brake having, in combination with a backing plate and shoes having adjacent separable ends provided with pivots carrying thrust rollers, a shaft having a transversely-floating cam acting on said rollers, a shaft bearing extending through the backing plate and in which said shaft is journaled, and a stamping to which said bearing is permanently secured and which is fixedly secured to said backing plate and which has guide surfaces engaged by the ends of said roller pivots.

5. A brake having, in combination with a backing plate and shoes having adjacent separable ends provided with pivots carrying thrust rollers, a shaft having a transversely-floating cam acting on said rollers, a shaft bearing extending through the backing plate and in which said shaft is journaled, and a stamping to which said bearing is permanently secured and which is fixedly secured to said backing plate and which has laterally-extending wings formed with guide surfaces engaged by the ends of said roller pivots.

6. A brake camshaft bracket comprising two separately-formed parts permanently secured together, one forming a shaft bearing, and the other being a stamped support adapted to be secured to a brake backing plate and having a stop lug projecting in the opposite direction from said bearing.

7. A brake camshaft bracket comprising two separately-formed parts permanently secured together, one forming a shaft bearing, and the other being a stamped support adapted to be secured to a brake backing plate and having a stop lug projecting in the opposite direction from said bearing and also having laterally-extending wings formed on their edges with guide surfaces.

8. A brake camshaft bracket comprising two separately-formed parts permanently secured together, one forming a shaft bearing, and the other being a stamped support adapted to be secured to a brake backing plate and having a stop lug projecting in the opposite direction from said bearing and also having pins for attaching the bracket to a brake backing plate and extended to serve as posts for attaching the brake return springs.

In testimony whereof, I have hereunto signed my name.

STANLEY WHITWORTH.